Oct. 14, 1952  J. E. WESCOTT  2,613,961
QUICK DISCONNECT HOLDING MEANS
Filed March 31, 1950  2 SHEETS—SHEET 1

John E. Wescott
INVENTOR.

BY James M. Clark
HIS PATENT ATTORNEY.

Oct. 14, 1952      J. E. WESCOTT      2,613,961

QUICK DISCONNECT HOLDING MEANS

Filed March 31, 1950      2 SHEETS—SHEET 2

John E. Wescott
*INVENTOR.*

BY *James M. Clark*

HIS PATENT ATTORNEY.

Patented Oct. 14, 1952

2,613,961

UNITED STATES PATENT OFFICE 2,613,961

QUICK DISCONNECT HOLDING MEANS

John E. Wescott, Hagerstown, Md., assignor to Fairchild Engine and Airplane Corporation, a corporation of Maryland Application March 31, 1950, Serial No. 153,047

12 Claims. (Cl. 287—20.5)

The present invention relates to holding and locking mechanisms and more particularly to quick-disconnect means for unlocking and releasing such mechanisms.

In releasable attachment mechanisms, it is usually desirable that the mechanism be quickly disconnected or released in a foolproof manner free from the possibility of the mechanism jamming or otherwise preventing complete release. Frequently in such quickly disconnectable holding mechanisms it is also required that a relatively large or heavy load be instantaneously released or unlatched by the application of a relatively small releasing or tripping force. Such conditions and requirements are often met with in the design and operation of aircraft components to which the present mechanism has proven particularly well adapted. An improved form of the present invention is especially applicable for the attachment of the landing gear actuator to the landing gear structure in order that the actuator may be disengaged from the landing gear in case of failure of the actuator, such as by jamming or other malfunctioning, and in which event the landing gear is permitted to fall to its extended operable position under the force of gravity.

The present invention consists essentially of a pin element having a frusto-conical portion engageable with a cylindrical bore within a second element from which the pin is to be quickly releasable. The improved mechanism comprises a compound locking bar or block assembly having opposed frusto-conical gripping surfaces adapted to engage the corresponding portion of the pin as it projects beyond the face of the bored supporting element. The releasable gripping block assembly is comprised of a plurality of pivotally interconnected sections including a pivoted toggle element arranged to engage and maintain the locking blocks in place and to selectively maintain or upset the alignment of the pivotal connections. A tripper element, pivotally mounted upon the board support element, is provided with a camming portion which upsets or throws the toggle element out of alignment with the locking blocks, which are thereby tripped and instantaneously separated from their gripping engagement with the pin, whereupon the axial load forces applied to the locking blocks cause the gripping jaws to be rapidly moved apart for the quick release of the pin element.

It is a major object of the present invention to provide an improved holding or locking mechanism which is quickly disconnectable in a foolproof and satisfactory manner. It is a further object to provide such a quick disconnect type holding mechanism which is adapted to hold a releasable member against the application of relatively high holding forces or heavy loads. It is a further object to provide such a quickly disconnectable holding mechanism which may be tripped by the application of relatively small tripping or releasing forces. A further object of the present invention resides in the provision of an improved toggle action locking mechanism which is simple in construction and economical to manufacture, considering the heavy loads to which it may be subjected. It is a still further object of this invention to provide such a quick disconnect locking mechanism which is relatively compact, occupies a small space or volume in respect to its large capacity and is adapted to lie flat against a plain surface. Further objects of the invention include an improved relationship of the component parts of the holding mechanism as well as improvements in the details of the respective elements of which it is composed.

Other objects and advantages of the present invention will occur to those skilled in the art after reading the following specification, when considered in conjunction with the attached drawings forming a part hereof, in which.

Figure 1:
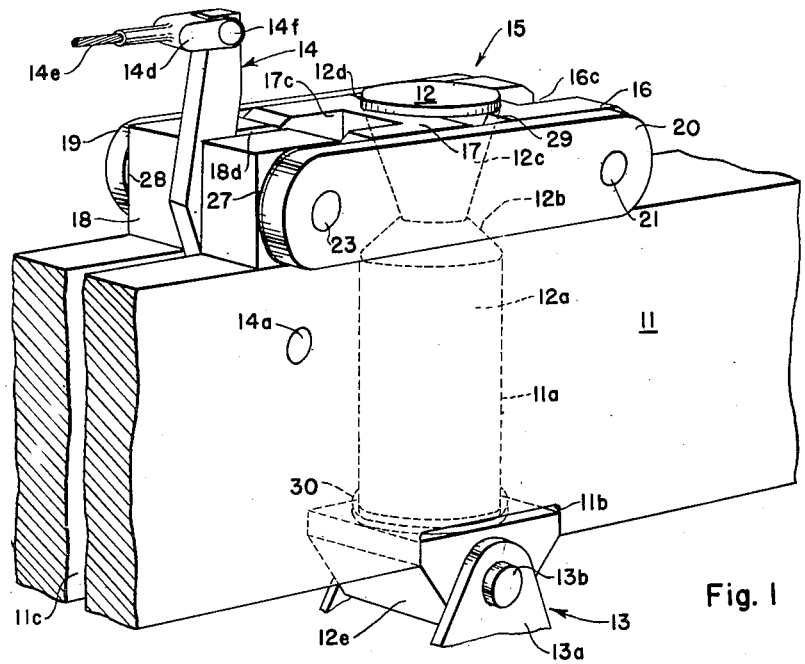
Fig. 1 is a perspective view of an improved form of the present invention as applied to a quickly releasable suspended member.

In the disclosed form of the invention the improved quick release mechanism is applied to the support of a suspended member 13 from the supporting structure 11 by means of the pin element 12 engaged by the toggle locking assembly 15 which is tripped and released by the trigger element 14. For the purposes of the present description the supporting structure 11 may be regarded as a beam member of rectangular cross-section provided with a vertically disposed bore 11a terminating in a recessed seat 11b at its lower end. The supporting structure 11 is also provided with a vertically disposed slot or recess 11c, to receive the lower portion of the trigger element 14, which is pivotally mounted upon the transversely extending pivot or pin 14a.

The releasable pin 12 is comprised of a cylindrical shank portion 12a terminating toward its upper terminal in an inwardly tapered or frusto-conical shoulder portion 12b which merges at a necked portion into a further outwardly tapered frusto-conical portion 12c of lesser taper comprising the bearing or gripping portion of the pin member. The last said gripping portion 12c terminates at a further short cylindrical portion 12d of substantially the same diameter as the main shank 12a and forms the upper flattened terminal of the pin member. The lower terminal of the pin is enlarged into a headed portion 12e of substantially squared or rectangular section in plan, and of a dimension to snugly fit against a washer 30 within the seat or recessed portion 11b of the bore 11a through the support member 11. The pin head portion 12e is transversely bored to receive the pin 13b supporting the suspended member 13 at its bifurcated terminal portion 13a.

The toggle locking assembly 15 comprises essentially a pair of opposed gripping blocks 16 and 17 having frusto-conical gripping portions 16a and 17a, respectively. The blocks 16 and 17 are identical in construction and form being oppositely disposed such that their gripping portions face each other and together form a combined complementary frusto-conical surface corresponding to the like surface 12c of the pin member 12. The gripping blocks 16 and 17 are provided with transverse bores or apertures 16b and 17b, respectively, which pass through their bifurcated portions 16c and 17c to receive the transverse pins 21 and 22 about which they are hinged or pivotally mounted. A third or toggle block 18 has a tongue portion 18a of such dimension that it fits within the bifurcated portion 17c of the gripping block 17. The tongue portion 18a is transversely bored at 18b for alignment with the bores 17b to receive the aforementioned pin 22. The toggle block 18 also has a vertically disposed slot 18d of substantially the same width as the slot 11c in the support member 11 and in vertical alignment therewith. This slot 18d causes the main body portion of the block 18 to become bifurcated and to have its bifurcated portions bored at 18c for the pin 23 which retains and rotatably supports the roller 24 within its slotted portion 18d.

The first gripping block 16 and the last mentioned toggle block 18 are pivotally interconnected at each side through the tie plates or straps 19 and 20, which are bored at 19a and 20a to receive the pin 21, and are also bored at 19b and 20b to receive the pin 23. These pins 21 and 23 are of the same length and are provided with washers 25, 26, 27 and 28 between the inner blocks and the outer straps 19 and 20 to improve the alignment and rotation of the blocks 16 and 18 with respect to the side straps, and to provide for wear. The pin 22, however, is shorter than the pins 21 and 23, extending only through the inner gripping block 17 and the tongue portion of the toggle block 18. The pin 22 is, accordingly, free to be rotated about the axis of the pin 23 and with respect to the outer gripping block 16 and the side straps 19 and 20. Each of the blocks 16, 17 and 18 in the locking and release assembly 15 is provided with flat upper and lower faces such that when they are at rest upon a plain surface such as the top of the support member 11, the parallel axes of the pins 21, 22 and 23 are in alignment and lie within the same horizontal plane. The ends of pins 21, 22 and 23 may be suitably upset or other means provided for preventing their separating from the tie plates.

In this position, the facing edges of the gripping blocks 16 and 17 are laterally spaced apart to provide an intermediate gap or tapered space as indicated at 29 on each side of the gripping portion 12c of the pin 12. The thickness of the washer 30 against the head of the pin 12 is such that the pin is securely clamped or retained within the support 11 due to the camming effect of the surfaces 12c, 16a and 17a, and forms a seat for the head 12e to serve as a stop for the pin 12. This insures that the blocks 16 and 18 bear against the tapered surface of the gripping portion 12c of the pin and transmit the vertical load from the pin laterally in the form of compression within each block against the pins 21 and 22, the latter pin further transmitting the compressive component of the vertical pin force by compression through the toggle block 18 and thence to the pin 23. Accordingly, while the quick disconnect holding assembly 15 is in its locked and loaded condition, the vertical load tends to outwardly separate the longer pins 21 and 23, which are retained in their respective positions by the outer straps 19 and 20 each of which are thus subjected to tension forces. With the edges tapered to form the side gaps 29, the pin 12 has less bearing at the sides and greater pressure is exerted in the lateral direction of unlocking motion of the parts 16 and 17.

The tripping element 14 is pivotally mounted at the transverse pivot pin 14a such that pull upon the cable 14e, attached by means of the clevis 14d and the pin 14f to the upper terminal of the tripper, causes the tripping element 14 to rotate in a counterclockwise direction about its pivot 14a. The central portion of the tripper element 14 is provided with a semi-circular recess 14b arranged to fit closely about the roller 24 which is freely rotatable about the transverse pin 23. Contact of the recess or detent 14b with the roller face serves as a limit stop for the tripper 14 in the locked position and also locks the pin 23 preventing any upward movement which might upset the alignment of the pins and thereby trip the mechanism. The lower side of the semi-circular edge of the opening 14b is formed into a cam surface 14c, the points along the surface of which are disposed increasingly farther from the axis of pivotation 14a as they extend away from the semi-circular recessed portion 14b.

Figure 4:
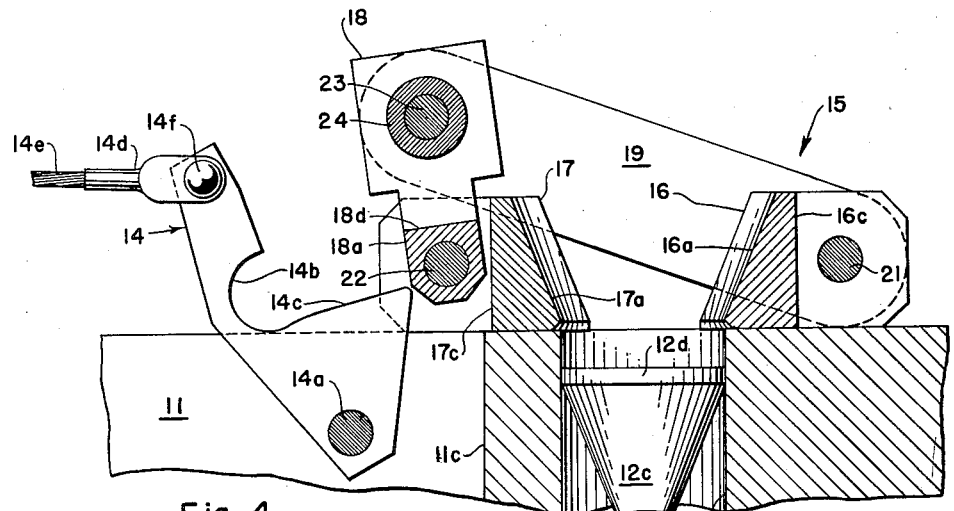
Fig. 4 is a fragmentary sectional side view showing the mechanism of Fig. 2 in the released condition.
Figure 3:
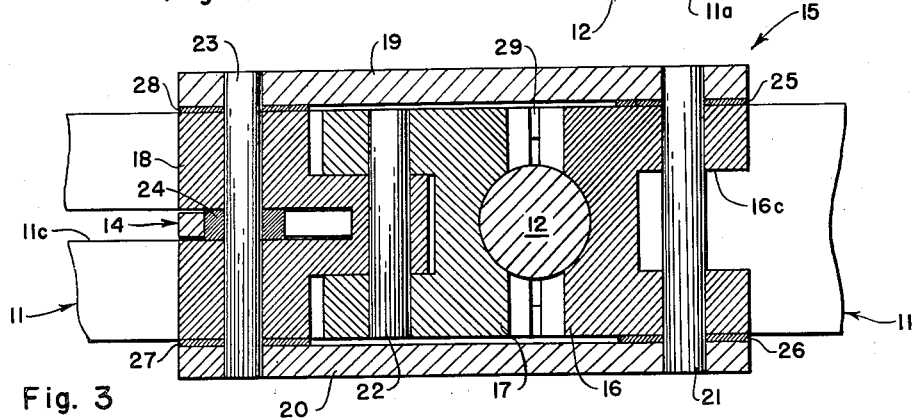
Fig. 3 is a sectional plan view as taken along the lines 3—3 of Fig. 2.
Figure 5:
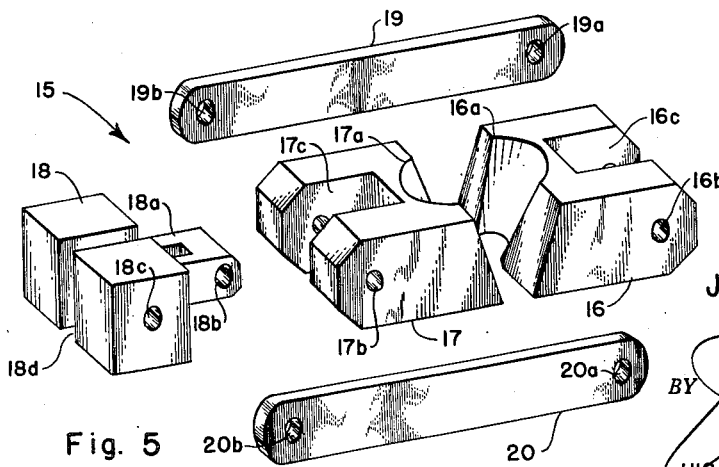
Fig. 5 is an exploded perspective view of certain of the more essential elements comprising the toggle gripping and locking block assembly.

The operation of the present quick-disconnect holding mechanism is as follows: The holding assembly 15 is opened by lifting the toggle block 18 upwardly such that the pivot 23 is moved above and out of alignment with the pivots 21 and 22, as shown in Fig. 4. The gripping assembly is then positioned upon the beam or support 11 such that the gripping surfaces 16a and 17a are positioned to clear the bore 11a in the supporting structure 11. With the suspended member 13 (or other load item to be released), secured to the lower end of the pin 12, the pin is inserted upwardly within the bore 11a until the washer 30 at the head 12e of the pin bears within the counter-bored recess 11b of the supporting structure. In this position, with the washer of the proper thickness, the frusto-conical gripping portion 12c of the pin will be properly positioned for engagement by the blocks 16 and 17. With the gripping portion 12c of the pin in its operative position, as shown in Fig. 4, the gripping assembly 15 is folded down into its flattened position by pushing downwardly on the toggle block 18 such that the axis of the pin 23 moves downwardly toward the same plane of the axes of the pins 21 and 22.

While the block 18 is being pushed downwardly to create the above-described toggle effect in which the block 17 is pushed toward the right against the gripping portion 12c it will also be understood that after the gripping face 17a makes contact with the portion 12c, a secondary movement takes place in that the tie straps 19 and 20 draw the pin 21 and the block 16 toward the left, or against the opposite face of the gripping portion 12c, as a result of continued rotation of the pin 23 about the now restricted intermediate pivot 22. As the pivot 23, together with its attached block 18, and the adjacent ends of the tie straps 19 and 20, are lowered, the axis of the pin 22 is pushed toward the right or toward the axis of the pin 21 thereby creating a toggle effect which is assisted by the aligning effect of the gripping portion 12c of the pin which causes the gripping face 17a of the block 17 to be wedged beneath the gripping portion 12c to thereby assist in aligning the axes of the pins 21, 22 and 23. As the roller 24 engages the cam face 14c it causes clockwise rotation of the trigger element 14, until in its lowest position of alignment the pin 23 and roller 14 are locked down within the detent 14b. Accordingly, after both blocks 17 and 16 have successively moved into place against the grip or bearing portion 12c of the pin, the toggle block 18 will also lie flat upon the upper surface of the support structure 11 similar to blocks 16 and 17, and the toggle block will assume the locked position shown in Fig. 2. As indicated above, the tripping element 14 has been rotated in the clockwise direction to this locking position by the cam and may be further urged in the clockwise direction by suitable biasing or tensioning means, to the position shown in Fig. 2, in which the recess 12b bears against the outer surface of the roller 24, and prevents the pin 23 from getting out of alignment. In this position the pin 12 will be securely gripped by the blocks 16 and 17 of the toggle holding assembly 15, as shown in Figs. 1 and 2.

The operation of the mechanism during its releasing phase is substantially opposite in sequence and movement as the above described locking operation, and is as follows: From the locked or holding position of the mechanism as shown in Figs. 1 and 2, the downwardly exerted load upon the member 13 is released by a lateral pulling force exerted on the cable 14e toward the left as viewed in these figures. This causes counterclockwise rotation of the tripper element 14 about its pivot 14a and as the cam face 14c is moved against the roller 24, it pushes the later upwardly above the horizontal plane of the aligned axes of the pins 21 and 22. It will be understood that the downward force, exerted by the load and transmitted by the tapered gripping portion 12c of the pin against the corresponding surfaces of the blocks 16 and 17, will serve to hold these blocks downwardly against the upper surface of the support 11 and against the lifting force exerted by the camming surface 14c of the tripper element. It will be apparent that as soon as this straight line relationship of the centers of the pins 21, 22 and 23 is broken or upset at any point, the mechanism immediately unlocks and permits the separation of the blocks 16 and 17, and the pin is permitted to fall away freely downwardly through the bore 11a and away from the support 11, the separation being caused by the wedging effect of the gripping portion 12c as it moves downwardly. It will be noted that the toggle block assembly 15 is free to move toward and away from the vertical axis of the pin 12 as well as to be angularly tilted with respect thereto as shown in Fig. 4, and for this reason it may be attached to the support 11 by suitable flexible means such as a pivoted link, or by a tethering chain or cable, to thereby prevent its becoming entirely separated from the support 11 and its tripper 14, and to prevent its becoming lost. In the releasing operation, when the blocks 16 and 17 have been separated a sufficient distance, the pin 12 is permitted to pass downwardly therethrough such as indicated in Fig. 4, where it is shown passing downwardly through the bore 11a.

Figure 2:
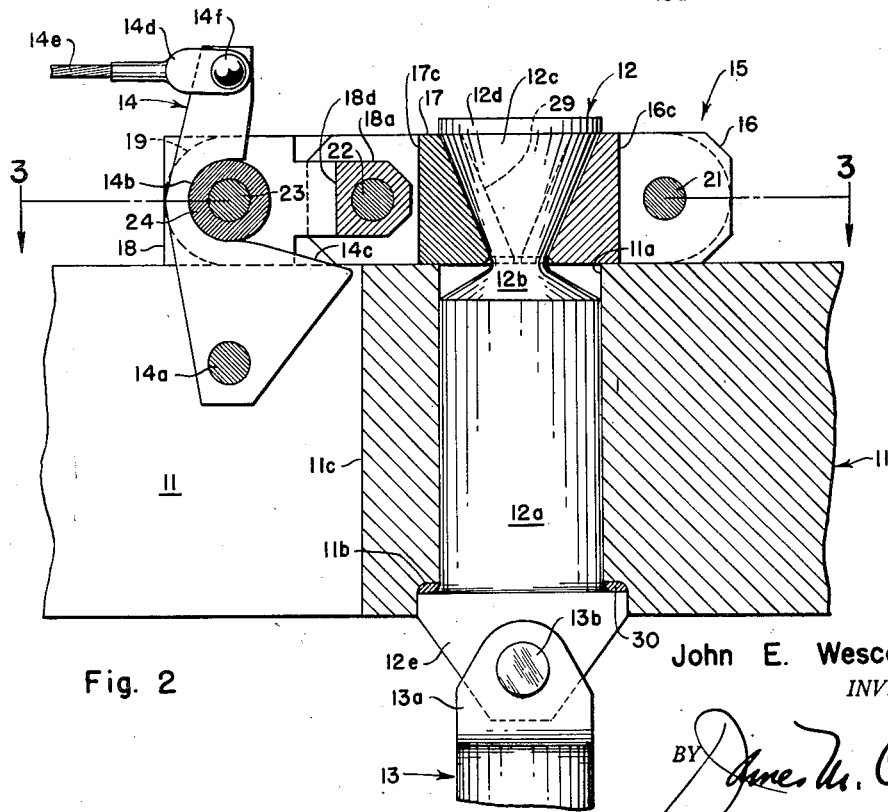
Fig. 2 is a sectional side view of the mechanism shown in Fig. 1.

It will be understood that the improved mechanism may be arranged differently than as shown and may be reversed such that the pin is the support and the bored member is the part which is released, such as by inverting the arrangement of Fig. 2. The improved mechanism of the present invention is also adapted for use in locking a detachable fuselage to the aircraft structure or in the locking of detachable wings in position with respect to the fuselage, for use with releasable fuel tanks, glider tow releases, locking gun breeches and many other similar uses. It is also adapted for the holding of any pin-shaped element from movement in the axial direction and accordingly may be substituted for threaded nuts, snap-rings, cotter pins and the like, or wherever quick release advantages are desirable. The pin may be hollow or tubular where reduction in weight is desirable and the pin head may be other than the shape which has been shown.

Other forms and modifications of the present invention, which will occur to those skilled in the art after reading the foregoing description, are intended to come within the scope and spirit of this invention as more particularly set forth in the appended claims.

I claim:

1. In a quick release mechanism including a support member defining an opening, and a loaded member insertable within said opening, said loaded member having a downwardly tapered gripping portion, a locking mechanism for quickly releasing said loaded member for separation from said support member comprising a pair of gripping elements having downwardly tapered complementary surfaces engageable with the tapered gripping surface of said loaded member, a toggle element pivotally linked to a first of said gripping elements and pivotally attached to a second of said gripping elements arranged to engage said loaded member gripping portion with a toggle effect in a pivotally aligned condition and a tripper element pivotally mounted said support member arranged to quickly release said loaded member by upsetting said pivotally aligned condition.

2. Mechanism for releasably retaining a releasable member in axial relationship with a support member having an opening therein, including a downwardly tapered portion of said releasable member projecting beyond a face of said support member, a pair of gripping elements having downwardly tapered surfaces complementary to the gripping portion of said releasable member, one of said gripping elements pivotally mounted at one terminal of a link means, a toggle element pivotally mounted upon an opposite terminal of said link means, said toggle element pivotally mounted to the second said gripping element, each of said gripping elements being directed inwardly of the terminals of said link means for creating a toggle gripping effect about said releasable member gripping portion in an aligned relationship of the axes of said pivotal connections for holding said releasable member against axial movement with respect to the recessed portion of said support member and tripping means pivotally mounted upon said support member arranged for lifting said toggle element and the adjacent terminal of said link means from the face of said support member for breaking said toggle gripping effect and releasing said releasable member by the lateral separation of the said gripping elements.

3. In a quick-disconnectable mechanism including a support member having an apertured portion, a releasable member arranged to fit within said apertured portion, said releasable member having a tapered grip portion projecting beyond a face of said support member, said grip portion tapered toward said support member face, said releasable member arranged to support a load tending to draw said releasable member axially through said apertured portion of said support member, toggle locking mechanism having tapered portions arranged to engage said grip portion of said releasable member for holding the same against said axial movement, said toggle locking mechanism including a plurality of articulated elements having a plurality of pivots aligned in their locking position, a link pivotally connected to an outer pair of said articulated elements to prevent their separation in said aligned locking position of said pivots, and tripping means including a lever element pivotally mounted upon said support member having a camming portion arranged to upset the said alignment of said pivots by moving one of said articulated elements away from said support member face for the quick release of said releasable member with respect to said support member.

4. In a quick release mechanism including a support member and a releasable member releasably engageable with said support member, said releasable member having a tapered gripping portion extending beyond a face of said apertured member in the engaged position of said members, said gripping portion tapered toward said support member face, said members normally subjected to forces tending toward movement of said gripping portion toward said support member face, a quick release mechanism mounted upon said support member face for selectively preventing and permitting the detachment of said members comprising a pair of gripping elements having surfaces engageable with the tapered gripping portion of said releasable member, a toggle element pivotally linked to a first of said gripping elements and pivotally attached to a second of said gripping elements arranged to engage said releasable member gripping portion with a toggle effect in a pivotally aligned condition, and tripping means including a lever having a detent portion engageable with one of said pivotal connections for locking said mechanism in said aligned condition, said tripping means including a cam portion arranged upon movement of said tripping means to upset said pivotally aligned condition for the quick release of one of said members from the other said member.

5. In a releasing mechanism, a supporting member provided with an apertured portion, a releasable member arranged to pass through said apertured portion, said releasable member having a tapered portion projecting beyond a face of said supporting member and tapered toward said supporting member face, toggle gripping means slidably supported upon said supporting member face including a pair of pivotally mounted elements having complementary tapered portions arranged for engagement with the tapered portion of said releasable member, said toggle gripping means including a third element pivotally connected to one of said pair of pivotally mounted elements, said pair of gripping elements arranged for engagement with the tapered portion of said releasable member upon the lateral alignment of the pivotal connections of all three of said elements, and a camming tripper element pivotally mounted upon said supporting member arranged upon rotation to displace one of said pivotal connections from said alignment for the lateral separation of said pair of gripping elements and the release of said releasable member.

6. In a quick-disconnectable mechanism including a support member having a recessed portion, a releasable member arranged to pass through said recessed portion, said releasable member having a tapered grip portion projecting beyond a face of said support member, said grip portion tapered toward said support member face, said releasable member arranged to support a load tending to draw said releasable member through said recess portion of said support member, a pair of articulated gripping blocks slidably supported upon said support member having tapered complementary portions arranged to engage said tapered portion of said releasable member for holding the same against movement through said recessed portion, a toggle element pivotally interconnected with each of said gripping elements for holding said releasable member in a position in which all of said pivotal interconnections are parallel and lie in the same plane, and tripping means for displacing one of said pivotal interconnections out of said plane for the lateral separation of said pair of gripping elements and the release of said releasable member.

7. Quick-disconnectable mechanism including a support member having an opening therethrough, a releasable member having a tapered portion arranged to extend through and project beyond a supporting face of said support member, said portion tapered toward said support member face, said releasable member arranged to be subjected to a load such that said tapered portion is drawn toward said supporting face of said support member, a pair of articulated elements slidably supported upon said supporting face of said support element having tapered complementary portions arranged to engage said tapered portion of said releasable member for holding the same against said load, a toggle element pivotally interconnected to each of said articulated elements in such manner that said articulated elements are arranged to engage the tapered portion of said releasable member for holding the same against said load when the axes of the interconnections of said pair of elements and said toggle element are parallel and lie in substantially the same plane, and a tripping element pivotally mounted upon said support member arranged upon movement to displace said toggle element from said alignment for the quick release of said releasable member by the lateral separation of said pair of elements.

8. In a quick-disconnectable mechanism including a support member having an opening, a releasable member arranged to fit within said opening, said releasable member having a tapered grip portion projecting beyond a face of said support member, said grip portion tapering toward said face of said support member, said releasable member arranged to support a load tending to draw said releasable member through said opening in said support member, toggle locking mechanism including a pair of articulated gripping elements having complementary tapered portions arranged to engage said tapered grip portion of said releasable member for holding the same against said movement, a toggle element pivotally connected to each said gripping element, and camming means movably supported upon said support member for upsetting said toggle locking mechanism by displacement of said toggle element from the said support member face for the release of said releasable member through said support member opening.

9. Holding and release mechanism comprising a fixed member and a releasable member, said releasable member having a tapered portion extending through a face of said fixed member and tapered toward said face in the holding position of said mechanism, first and second grip elements having opposed gripping portions tapering away from said fixed member face and arranged to engage the tapered portion of said releasable member to prevent its withdrawal toward said fixed member face, a toggle element pivotally mounted upon said second grip element, a link element pivotally connected to said toggle element and to said first grip element arranged to prevent separation of said first grip element with respect to said pivotally interconnected second grip element and with respect to said toggle element, the three said pivotal interconnections between said first grip element and said link element, between said second grip element and said toggle element, and between said toggle element and said link element being arranged on parallel axes lying in the same general plane to provide a toggle grip upon said tapered gripping portion of said releasable member in the holding position, and means for displacing the axis of the pivotal connection between said toggle element and said link element away from the face of said fixed member for breaking said toggle effect and permitting separation of said first and said second grip elements for the release of said releasable member.

10. Holding and release mechanism comprising a fixed member and a releasable member, said releasable member having a tapered portion extending through a bearing face of said fixed member and tapered toward said bearing face in the holding position of said mechanism, first and second grip elements having opposed gripping portions tapering away from said fixed member face and arranged to engage the tapered gripping portion of said releasable member to prevent its withdrawal toward said fixed member face, a toggle element pivotally mounted upon said second grip element, a link element pivotally connected to said toggle element and to said first grip element arranged to prevent separation of said first grip element with respect to said pivotally interconnected second grip element and with respect to said toggle element, the three said pivotal interconnections between said first grip element and said link element, between said second grip element and said toggle element, and between said toggle element and said link element being arranged on parallel axes lying in the same general plane to provide a toggle grip upon said tapered gripping portion of said releasable member in the holding position, means including a lever element mounted upon said fixed member arranged upon rotation for displacing the axis of the pivotal connection between said toggle element and said link element away from the face of said fixed member for breaking said toggle effect and permitting separation of said first and said second grip elements for the release of said releasable member.

11. Holding and release mechanism comprising a fixed member having a bore and a headed removable member, said removable member having a tapered portion extending through said fixed member bore beyond a bearing face of said fixed member and tapered toward said bearing face in the holding position of said mechanism, first and second grip elements having opposed gripping portions tapering away from said fixed member face and arranged to engage the tapered gripping portion of said removable member to prevent its withdrawal toward said fixed member face, a toggle element pivotally mounted upon said second grip element, a link element pivotally connected to said toggle element and to said first grip element arranged to prevent separation of said first grip element with respect to said pivotally interconnected second grip element and with respect to said toggle element, the three said pivotal interconnections between said first grip element and said link element, between said second grip element and said toggle element and between said toggle element and said link element being arranged on parallel axes lying in the same general plane to provide a toggle grip upon said tapered gripping portion of said removable member, and lever means including a cam for displacing the axis of the pivotal connection between said toggle element and said link element away from the face of said fixed member for breaking said toggle effect and permitting separation of said first and said second grip elements for the release of said movable member.

12. Holding and release mechanism comprising a fixed member having a bore and a headed removable member, said removable member having a tapered portion extending through said fixed member bore beyond a bearing face of said fixed member and tapered toward said bearing face in the holding position of said mechanism, first and second grip elements having opposed gripping portions tapering away from said fixed member face and arranged to engage the tapered gripping portion of said removable member to prevent its withdrawal toward said fixed member face, a toggle element pivotally mounted upon said second grip element, a link element pivotally connected to said toggle element and to said first grip element arranged to prevent separation of said first grip element with respect to said pivotally interconnected second grip element and with respect to said toggle element, the three said pivotal interconnections between said first grip element and said link element, between said second grip element and said toggle element and between said toggle element and said link element being arranged on parallel axes lying in the same general plane to provide a toggle grip upon said tapered gripping portion of said removable member, and trip means including a pivotally mounted lever element having a detent portion arranged to maintain the pivotally interconnected portions of said toggle and link elements in alignment with the other said pivotal interconnections in the holding position of said mechanism, said lever element having a cam portion arranged upon rotation of said pivotally mounted lever element to cause the pivotally interconnected portions of said toggle and link elements to be displaced away from the face of said fixed member to thereby break said toggle effect and permit release of said gripping portion of said removable member.

JOHN E. WESCOTT.

REFERENCES CITED

The following references are of record in the file of this patent:

UNITED STATES PATENTS

| Number | Name | Date |
|---|---|---|
| 1,564,001 | Krell | Dec. 1, 1925 |
| 1,726,521 | Davis | Aug. 27, 1929 |